N. SAWYER.
PRESSED BRICK MACHINE.
No. 5,386. Patented Dec. 4, 1847.
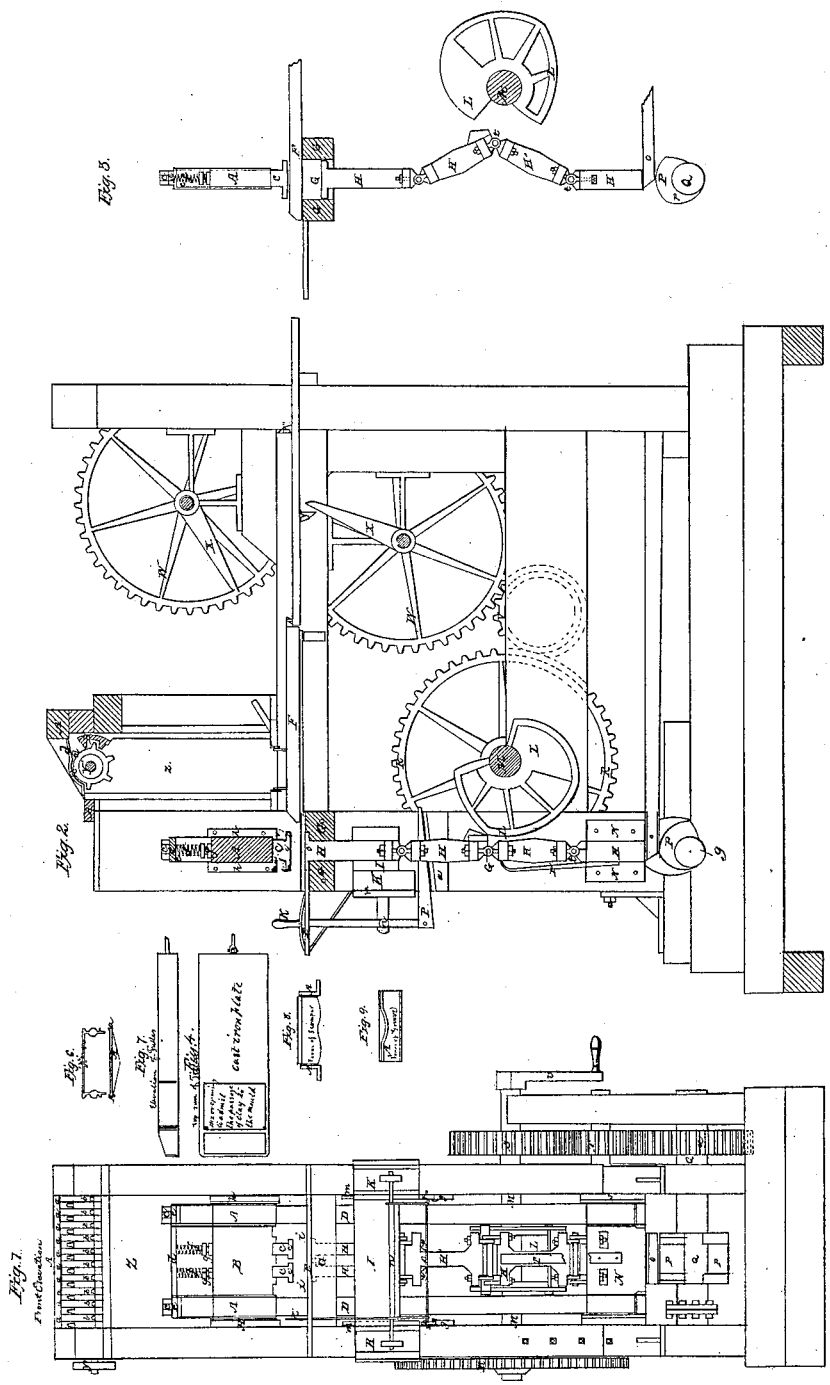

UNITED STATES PATENT OFFICE.

NATHAN SAWYER, OF BALTIMORE, MARYLAND.

BRICK-PRESS.

Specification of Letters Patent No. 5,386, dated December 4, 1847.

*To all whom it may concern:*

Be it known that I, NATHAN SAWYER, of the city of Baltimore, in the State of Maryland, have invented a new and useful machine for pulverizing clay or brick earth and for forming the same into bricks by means of a press constructed for that purpose; and I do hereby declare that the following is a full, clear, and exact description of the construction and operation of the same, reference being had to the annexed drawings, making a part of this specification, in which—

Figure 1 is a front elevation or transverse section—Fig. 2 a longitudinal or side elevation—and Fig. 3 a transverse section, showing the action of the "levers."

In each of these figures, when the like parts occur, they are designated by the same letters of reference. The drawings are made on a scale of three inches to one inch of the model.

Y' in Figs. 1 and 2 is the pulverizer, which is to be surrounded by a hopper for containing the clay to be pulverized. This pulverizer is a horizontal revolving toothed cylinder, somewhat resembling the common threshing machine, the teeth $b, b, b$, of which revolve between bars or strips of iron, in principle not unlike the saw cotton gin. These bars or strips $a, a$, extend the whole length of the cylinder, forming a grating which covers the entire upper part of the cylinder, and constitutes the bottom of the hopper, into which the clay is put for the purpose of pulverization. The teeth of the cylinder must project from 1 inch to three-fourths of an inch, above the bars $a, a, a$, which are made in part to conform to the circle described by the teeth of the cylinder, in order to give them a greater action on the clay, than would have been afforded by straight bars. These bars or strips of iron $a, a, a$, prevent stones or any other hard substance, from passing through into the machine below, and assist in pulverizing the clay. Behind the cylinder and below the grate-bars, there is a concave bed, attached to the two cheeks, which support the ends of the cylinder. This bed B' contains several rows of teeth, similar in shape to the teeth in the cylinder, the concavity of the bed being concentric with the circle described by the teeth of the cylinder—so that the teeth are made to interlock, the spaces being very little wider than the thickness of the thickness of the teeth. The contact is very close, and the clay in passing through is ground very fine. The pulverized clay falls into the trunk Z, which extends from the lower part of the pulverizer nearly down to the floor, which covers the upper part of the machine. This trunk Z is in the form of a hopper, as it is intended to support the clay which must accumulate for the supply of the machine. The opening in the bottom of the hopper is just large enough to supply the machine with clay without causing much weight to rest upon the floor above mentioned. The necessity of preventing the clay from resting on the floor will be hereafter explained. This trunk Z may be made with its sides parallel and cutting a hole through the bottom sufficiently large to permit the clay to fall through to the opening in the floor over the filler, instead of being made in the form of a hopper. The filler F, is that part of the machine which is used for supplying the machine with clay—for regulating the form of the clay at the top of the mold before it is compressed, and to discharge the bricks after they have been compressed and reach the top of the mold. This filler F moves underneath the floor above mentioned, through which floor there is an opening large enough to admit the passage of the necessary quantity of clay to supply the machine. There is beneath the filler, a smooth cast iron plate, an end view of which is shown in Fig. 6, on the edges $a, a$, of which, the filler moves, which cast iron plate, I denominate the filler bed. That part of the filler which conveys the clay to the mold resembles four sides of a box, having neither top nor bottom, as shown in Figs. 4 and 7. The filler is made to traverse over the bed A Fig. 6 and the top of the molds by means of the arms X, X', connected with the shafts X'', X'', and moved by the wheels W, W. The arm X by coming into contact with the pin Y in the filler tail moves it forward a suitable distance to discharge the clay into the chamber of the mold, when the arm X' meets the pin Y'' and carries it back to its place below the floor, when it is again filled with clay. It has been found necessary to give the clay in the mold a concave form, which is done by attaching a scraper Fig. 8, to the front end of the filler, the bar $a, a$, of which passes through the sides of the filler, and is guided by grooves in two pieces of cast iron $l, l$, (these grooves $b, b$, are shown in the small drawing Fig. 9), attached to the mold on each side of the filler, by which the scraper is depressed just enough to remove by the circular form giving to the bottom of the scraper, the required quantity of clay from the top of the mold. The front end of the filler serves also to remove the bricks from the mold, after they are compressed. The motion of the filler may be suspended by a sliding pin in the filler tail, or by sliding the arm X out of gear, or by any other device, which the builder may see fit to adopt.

The molds G, G, I make of cast iron, lined with steel plates or cast iron chilled plates. They must be most accurately fitted together and their surfaces made very smooth. The whole should be hooped with wrought iron to prevent any possibility of yielding under the pressure. The cavity of the mold should be about six inches deep. The pistons C, which perform the pressure on the upper surface of the bricks, are attached to the lower edge of a piece of cast iron B, Fig. 1, which I denominate the upper "cross-head." A hole is drilled through this cross-head, exactly over the center of the mold beneath, and a rod of iron, attached to the center of the piston, passes up through the cross-head. The piston is kept from turning by right line projections on the lower edge of the cross-head.

Upon the upper end of the rod which passes through the cross-head, there is a screw and nut $g$, $g$, so adjusted, as to allow a vertical movement of the piston of a quarter or three-eighths of an inch. Upon the top of this nut is a spiral spring $f$, $f$, the upper end of which rests against a plate of iron $d$, $d$. This spring has a tendency to force the piston down upon the surface of the brick, yet, when the brick is being pressed, the elasticity of the spring is overcome, and the piston is brought into solid contact with the cross-head B, but when the piston is about being separated from the upper surface of the brick, the spring $f$, $f$, by forcing the piston down, prolongs the contacts and causes a more gradual separation of the brick and piston to take place, which entirely prevents the cracking of the brick, when being discharged from the mold. This cracking may also be prevented by a lever and weight.

The lower piston H, H, is connected to the slide I, which works in guides K, K, attached to the two side timbers of the machine, this slide or cross-head I is jointed to the upper end of a toggle-jointed lever H', H', the lower end of which lever is jointed to the upper edge of the lower cross-head N. The two cross-heads B and N, and the two columns D, D, which pass through them and are secured at top and bottom by the nuts $c$, $c$, constitute a sliding frame, which moves in the guides $h$, $h$, K, K and $s$, $s$, confined to the side timbers of the machine. The motion of this frame and the straightening of the toggle-joint lever, is caused by the two cams L, L and P, P attached to the shafts M, M and Q, Q, the cam L, L, pressing against the toggle-joint causes the slide I with the lower piston H, to which it is attached to move upward and the cross-head B with the upper piston C to move downward, and this motion continues by the operation of the cam, until the levers are straightened, when the distance between the faces of the two pistons H and C, will be equal to the required thickness of the brick; at this instant the lower cam P, P, commences its action upon the lower cross head N, which being a part of this sliding frame to which the toggle-jointed lever and the sliding portion is attached, the whole is elevated until the lower piston H, upon which the brick rests, reaches the top of the mold. The toggle-joint lever H', H' is held in this vertical position, by the peculiar shape of the cam, L, L, until the upper edge of the brick is seen above the top of the mold, when the lever commences receding, which causes a separation to take place between the surface of the brick and the upper piston, at which time the spiral spring $f$, $f$, at the top of the piston rod serves to prolong the contact, as I have before mentioned. The upward motion of the sliding frame, continues until the brick is elevated to the top of the mold, at which time the upper piston is high enough to allow the pillar to pass under it, when it is met by the filler and shoved off, as above mentioned, as soon as the brick is removed, the cam L, L, falls off very abruptly, by which, the toggle-joint recedes so far, as to permit the piston H to descend to the bottom of the mold, which leaves the cavity to be filled with clay, as above mentioned. As soon as the filler recedes, the sliding frame is made to descend, by the peculiar shape of the cams P, P, and the cam L, L then again presses the toggle-joint, and a second operation is performed as above described.

The slide I to which the lower piston H is attached rests upon a wedge $p$, at each end, when the slide is at its lowest point, at which time, the mold is being filled with clay, and the wedge by being withdrawn or shoved in increases or decreases the depth in the chamber of the mold and consequently increases or decreases the quantity of clay within the mold. The wedges $p$, $p$, are connected with the rock-shaft $n$, and lever $k$, as seen in the drawing. There is a spring R attached to the front side of the lower cross-head N, the upper end of the spring rests against the toggle-joint, for the purpose of throwing it off its center as the cam recedes. The thickness of the brick is regulated by the screws $c, c, e, e,$ on the columns above the cross-head A, B, A.

O is a piece of plank placed between the lower cross-head N and the cam P, P, it may be confined by a hinge to the back sill of the machine with props beneath, it acts as a spring to sustain a portion of the weight of the sliding frame, it also sustains the lateral pressure of the cam, which would otherwise be directed against the cross-head— that part of the spring which works between the cam and cross-head, must be covered with boiler iron. A lever with a weight on the end, nearly equal to the weight of the sliding frame, may be used instead of this spring board. R, S, T, U, V' and W are cog-wheels set in motion by the crank V.

What I claim as my invention, and desire to secure by Letters Patent, are,

1. The construction of the pulverizer as herein set forth, it being a cylinder with teeth working between and projecting above grate-bars as a means of preventing stones or other hard substance from passing through into the machine below.

2. I claim the method, substantially as described, of pressing the bricks by the downward and upward pressure of the pistons and retaining their pressure until the bricks are elevated above the bed, in combination with the method of elevating the two sets of pistons while the pressure is retained on the bricks as described.

3. I claim the method, substantially as described, of preventing the sudden separation of the upper pistons from the surface of the bricks by the interpositoin of springs or their equivalents between the pistons and that part of the machinery by which they are elevated.

4. The cross-head may be used without this movable piston, by permitting it to have a slight movement on the columns, and the spring being placed in the top of the cross-head will also effect the object, though not in so perfect a manner—a lever and weight applied in the place of a spring might also be used to some advantage.

N. SAWYER.

Witnesses:
ALEX A. KENNARD,
L. O. THURIN.